United States Patent [19]
Griffis

[11] Patent Number: 5,032,328
[45] Date of Patent: Jul. 16, 1991

[54] METHOD FOR CASTING FRIABLE ASBESTOS-CONTAINING MATERIAL INTO A NON-FRIABLE MASS

[76] Inventor: Steven C. Griffis, 2929 Ave. D, Council Bluffs, Iowa 51501

[21] Appl. No.: 433,564

[22] Filed: Nov. 8, 1989

[51] Int. Cl.$^5$ .................... B28B 3/00; B29B 17/00; B32B 31/00
[52] U.S. Cl. .................... 264/37; 264/86; 264/112; 264/267; 264/333; 264/DIG. 32
[58] Field of Search .................... 264/37, 86, 267, 313, 264/338, DIG. 69, DIG. 32, DIG. 49, 109, 112, 333

[56] References Cited

U.S. PATENT DOCUMENTS

| | | | |
|---|---|---|---|
| 619,810 | 2/1899 | Upham | 264/267 X |
| 1,423,000 | 7/1922 | Mattison | 264/DIG. 32 X |
| 1,958,184 | 5/1934 | Cross | 264/313 X |
| 2,134,671 | 10/1938 | Payne | 264/267 X |
| 2,572,438 | 10/1951 | Branson | 264/267 X |
| 2,962,767 | 12/1960 | Trojanowski et al. | 264/313 |
| 3,479,704 | 11/1969 | Reed | 264/267 X |
| 3,573,148 | 3/1971 | Habgood, Jr. et al. | 264/112 X |
| 3,634,565 | 1/1972 | Schaerer | 264/267 X |
| 3,904,723 | 9/1975 | Prince | 264/333 X |
| 4,497,662 | 2/1985 | Chisholm et al. | 264/486 X |
| 4,652,404 | 3/1987 | Mallek et al. | 264/333 X |
| 4,705,429 | 11/1987 | Natale | 405/128 |
| 4,802,839 | 2/1989 | Hidawa | 264/313 X |
| 4,821,397 | 4/1989 | Lyons | 29/426.4 |
| 4,828,883 | 5/1989 | Ramun | 264/117 X |
| 4,854,843 | 8/1989 | Takeda et al. | 264/313 X |
| 4,865,488 | 9/1989 | Huston et al. | 405/128 X |
| 4,876,054 | 10/1989 | Goodwin | 264/338 X |

FOREIGN PATENT DOCUMENTS 2062048  5/1981  United Kingdom ................ 264/267

Primary Examiner—Jan H. Silbaugh
Assistant Examiner—Karen D. Kutach
Attorney, Agent, or Firm—Zarley, McKee, Thomte, Voorhees & Sease

[57] ABSTRACT

A method for casting friable asbestos-containing material into a non-friable mass includes the steps of: (1) mixing portland cement, molding plaster, plasticizer, water and friable asbestos-containing material in a mixer; (2) pouring the mixture into a plastic bag positioned in a form; (3) compressing the mixture within the form prior to the curing process; (4) embedding a lifting eye in the mixture; (5) allowing the mixture to cure to a hardened state; (6) removing the form from the hardened mass; and (7) sealing the upper end of the plastic bag to enclose the hardened mass.

8 Claims, 4 Drawing Sheets

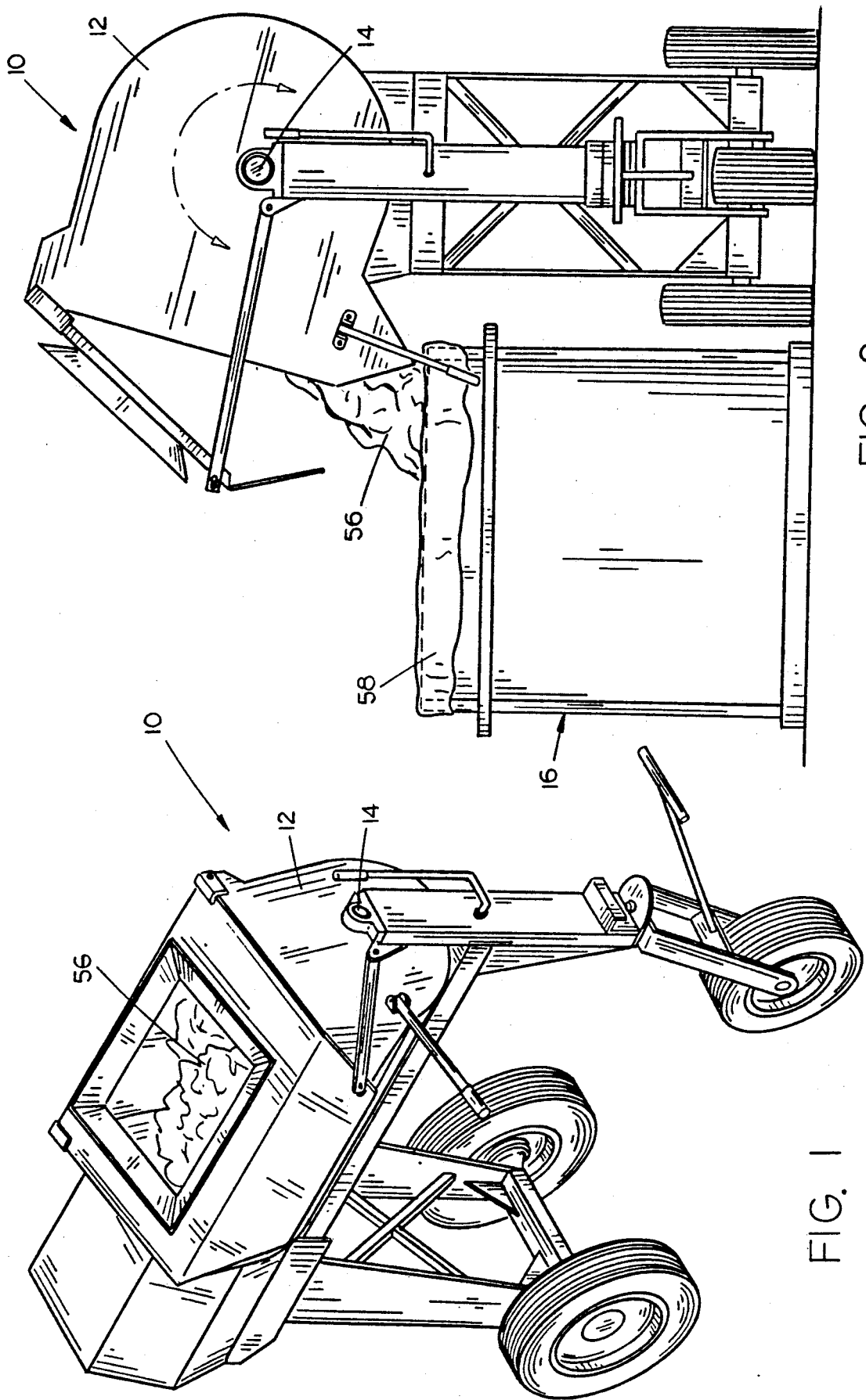

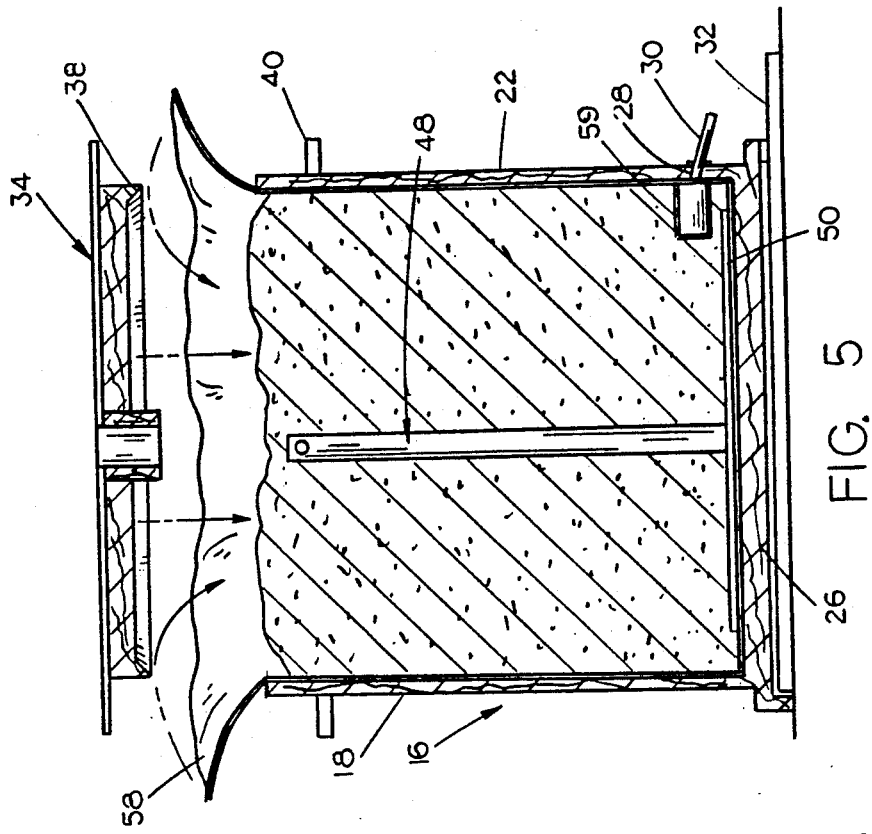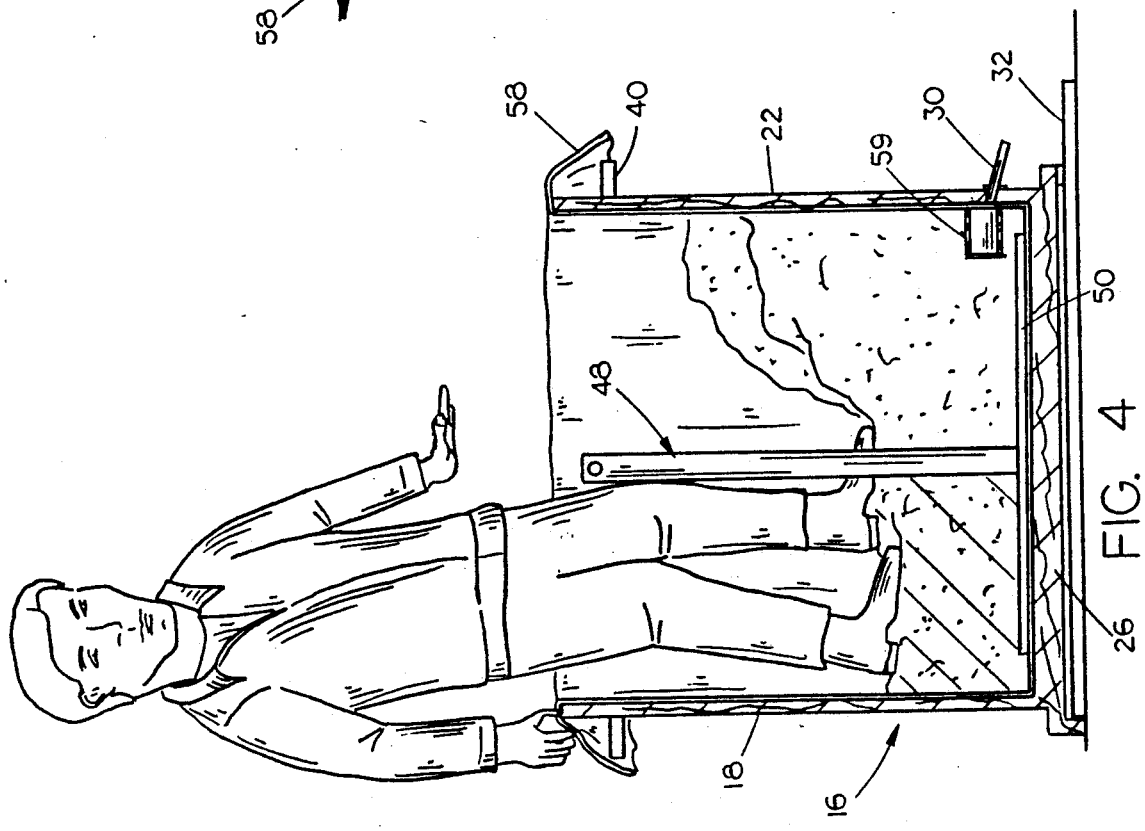

METHOD FOR CASTING FRIABLE ASBESTOS-CONTAINING MATERIAL INTO A NON-FRIABLE MASS

BACKGROUND OF THE INVENTION

Airborne asbestos contamination in buildings is a significant environmental problem. Asbestos-containing material (ACM) in buildings is normally found in three forms: (1) sprayed or troweled on ceilings and walls; (2) in insulation around hot or cold pipes, ducts, boilers, and tanks; and (3) in a variety of other products such as ceiling and floor tiles and wall boards. In general, most of the ACM is friable and the disposal of the same, after removal, is a serious problem. The Environmental Protection Agency recommends that removed ACM should be wrapped in six-mil plastic sheets or placed in plastic bags, labeled as asbestos waste, and transported to a solid waste site. A problem is involved in that much of the removed ACM may be wet and contaminated. When the plastic bags are stored one upon the other in a truck or the like, the lowermost bags are subjected to considerable pressure and the plastic bags may be punctured which may result in contaminated water and materials escaping from the bag. A further problem associated with the conventional plastic bag method of storing and transporting ACM is that the bags are extremely bulky due to the friable nature of the ACM.

It is therefore a principal object of the invention to provide an improved method of storing and transporting friable asbestos-containing material.

A further object of the invention is to provide a method of casting friable asbestos-containing material into a non-friable mass for storage or disposal.

Still another object of the invention is to provide a method of casting friable asbestos-containing material into a non-friable mass which greatly reduces the volume of the ACM.

Still another object of the invention is to provide a method of casting friable asbestos-containing material into a non-friable mass so that the mass may be easily stored and/or transported.

Still another object of the invention is to provide a method of casting friable asbestos-containing material into a non-friable mass which reduces the risk of environmental contamination.

Still another object of the invention is to provide a method of casting friable asbestos-containing material into a non-friable mass which is economical.

These and other objects of the present invention will be apparent to those skilled in the art.

BRIEF DESCRIPTION OF THE DRAWINGS

FIG. 1 is a perspective view of a conventional mixer used to mix the friable asbestos-containing material with water, portland cement and a plasticizer;

FIG. 2 is a side view illustrating the asbestos-containing material mixture being dumped into a form;

FIG. 4 is a side view illustrating the manner in which the mixture is compressed within the form;

FIG. 5 is a sectional view illustrating the lid being mounted on the top of the form;

SUMMARY OF THE INVENTION

Friable asbestos-containing material is placed in a conventional cement mixer together with portland cement, plasticizer and water. The materials are mixed and placed in a plastic-lined form having a lifting eye positioned therein. The mixture is compressed within the form and allowed to cure into a hardened non-friable mass. During the curing process, excess water is drained from the form and is collected in a suitable container with the excess water being utilized in a subsequent mixing operation. When the mass has hardened, the form is stripped from the mass and the mass is sealed with the plastic. The lifting eye is then utilized to lift the mass onto a truck or the like for transport to a storage facility or land fill.

DESCRIPTION OF THE PREFERRED EMBODIMENT

Figure 3:
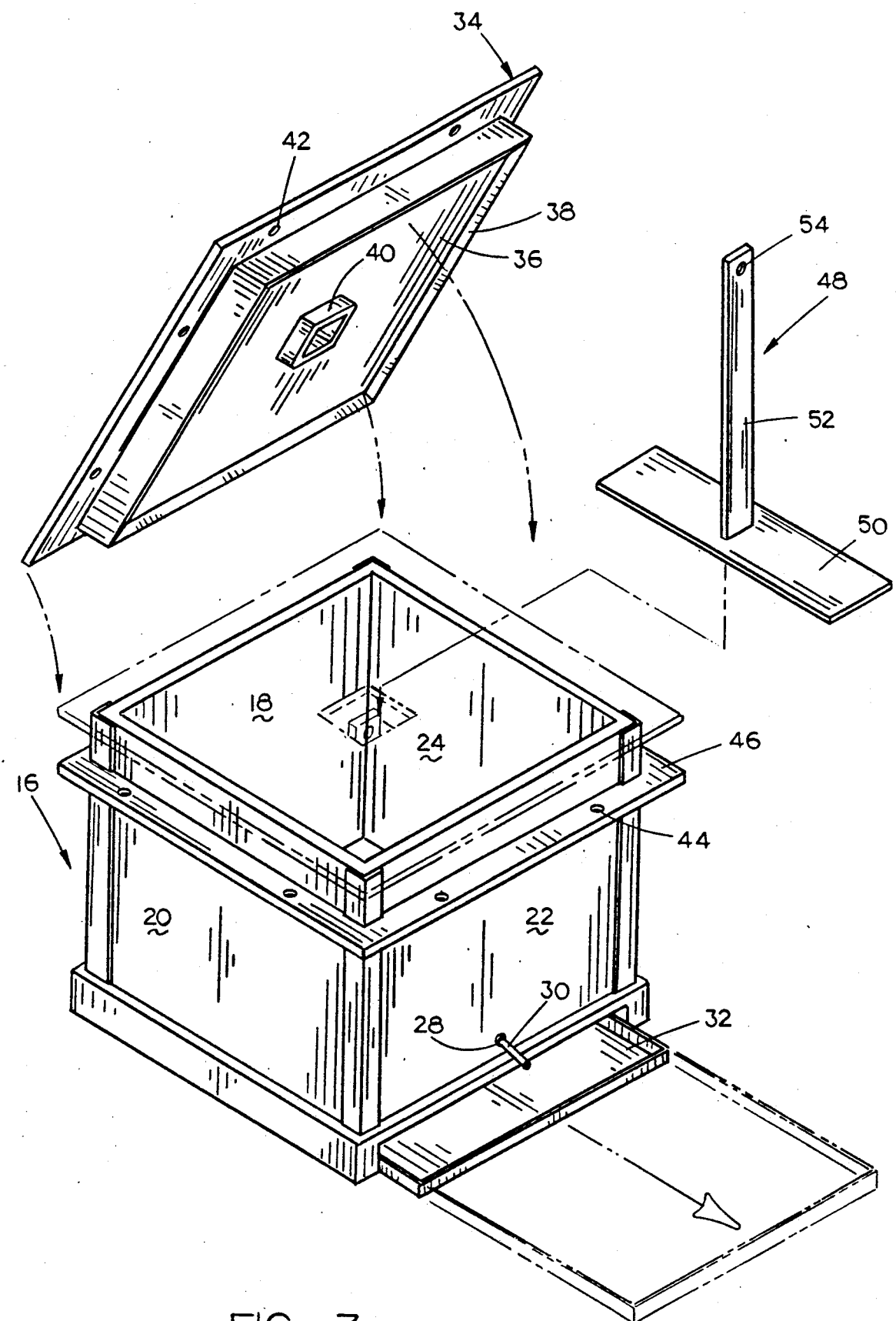
FIG. 3 is an exploded perspective view of the form used to create the non-friable mass of the invention.
Figure 6:
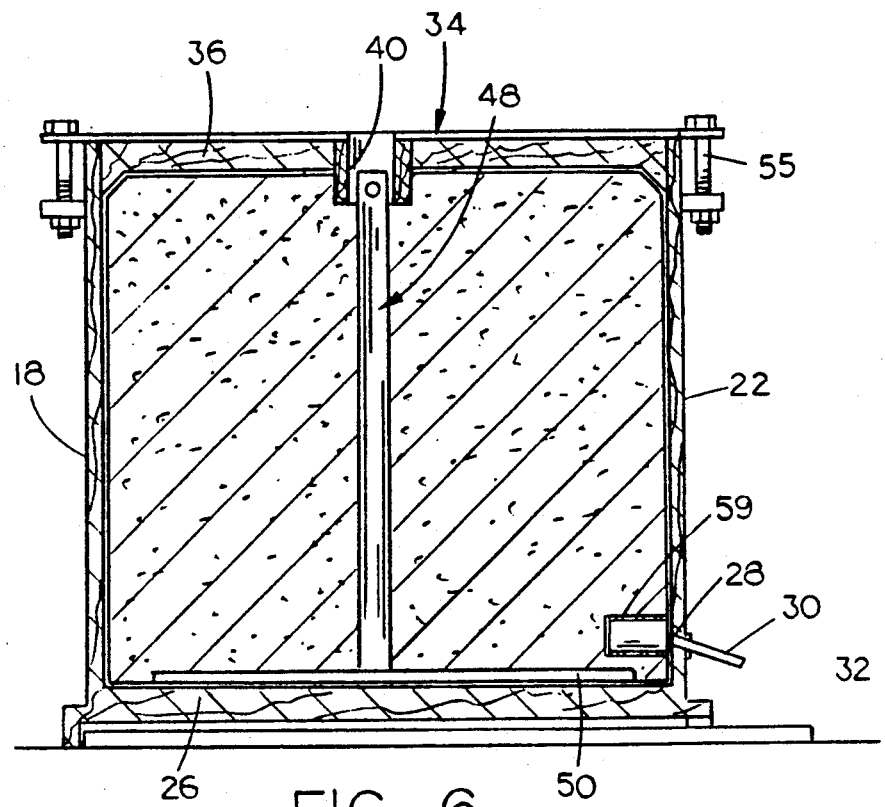
FIG. 6 is a sectional view illustrating the asbestos containing material mixture within the closed form.

Referring to the drawings, the numeral 10 refers to a conventional concrete mixer having a mixing hopper 12 pivotally mounted at 14 to enable the contents of the hopper 12 to be dumped into the interior of a form 16. Form 16 may be of any desired shaped but preferably is in the form of a cube so as to include sides 18, 20, 22 and 24 having upper and lower ends. Bottom 26 extends between the lower ends of the side walls as best seen in FIG. 6. Side 22 is provided with a weep opening 28 formed therein from which extends a drain pipe 30 as will be described in more detail hereinafter. Drain tray 32 is located beneath the form and the outer end of the drain tube 30 as seen in FIGS. 3 and 6.

Form 16 includes a removable compression cover or lid 34 having a downwardly projecting portion 36 tapered at its periphery generally referred to by the reference numeral 38 (FIG. 5). Protrusion 40 also projects downwardly from the lid 34 as seen in FIG. 3. Lid 34 is provided with a plurality of bolt openings 42 at its periphery adapted to register with openings 44 in the member 46 which extends around the sides of the form as illustrated in FIG. 3.

The numeral 48 refers to a lifting eye which is inserted into the form and which has a base portion 50 and a vertically extending portion 52 having an opening 54 at its upper end. As seen in FIG. 6, when cover 34 is positioned on the form, the upper end of vertical portion 52 protrudes upwardly into the protrusion 40.

The asbestos-containing material is referred to generally by the reference numeral 56 and is deposited into the mixer 10. The number of bags of ACM deposited into the mixer will depend upon the particular size of the form. Assuming that the form is for a one cubic yard cube, the contents of approximately 40–50 bags of the ACM material will be dumped into the mixer 10 with each of the bags weighing approximately 50 pounds. Approximately 300 pounds of portland cement is added to the ACM together with approximately 85 gallons of water. Although not necessary, it is preferred that approximately 100 pounds of molding plaster also be added to the mixture as well as approximately eight ounces of plasticizer such as PLASTIFLOW-NA sold by Nox-Crete, Inc. of Omaha, Nebra. The chemical name for PLASTIFLOW-NA is lignosulfonate/napthalene sulfonate blend. Both the molding plaster and the plasticizer are added to the mixture to accelerate the curing or set up time.

It is recommended that the interior of the form be first lined with some form of plastic bag (not shown) to aid in the non-friable mass to be subsequently removed. A six-mil plastic bag 58 is then inserted into the interior of the form so that the top edges thereof may be folded over the upper ends of the side walls of the form. The portland cement, molding plaster, water, plasticizer and ACM mixture is then dumped into the interior of the bag 58 positioned in the form 16. As the material is dumped into the interior of the form, it is recommended that the material be compressed in the form such as illustrated in FIG. 4, although other means of compression could also be used. It should be noted that workers practicing the method would normally wear protective clothing and protective masks although the same is not shown in FIG. 4.

The mixture is compressed into the form until the mixture has reached the upper portion of the form as illustrated in FIG. 5. The cover 34 is then lowered onto the form and the bolts 55 are inserted through the registering openings 42 and 44 and tightened which causes the cover 34 to be tightened onto the form so that the member 36 moves downwardly into the interior of the form to further compress the material in the form. The tapered protrusion 38 creates a beveled edge at the upper periphery of the resultant mass.

To facilitate the draining of excess water from the mass during the curing, it is recommended that a perforated collection container 59 be placed in the material for communication with the inner end of the drain pipe 30. During the compression of the material in the form and during the curing process, excess moisture will tend to collect in the perforated container 59 and will drain outwardly through the drain pipe 30 into the pan 32 so that the contaminated water draining into the pan may be collected and subsequently used in other mixing operations.

Figure 7:
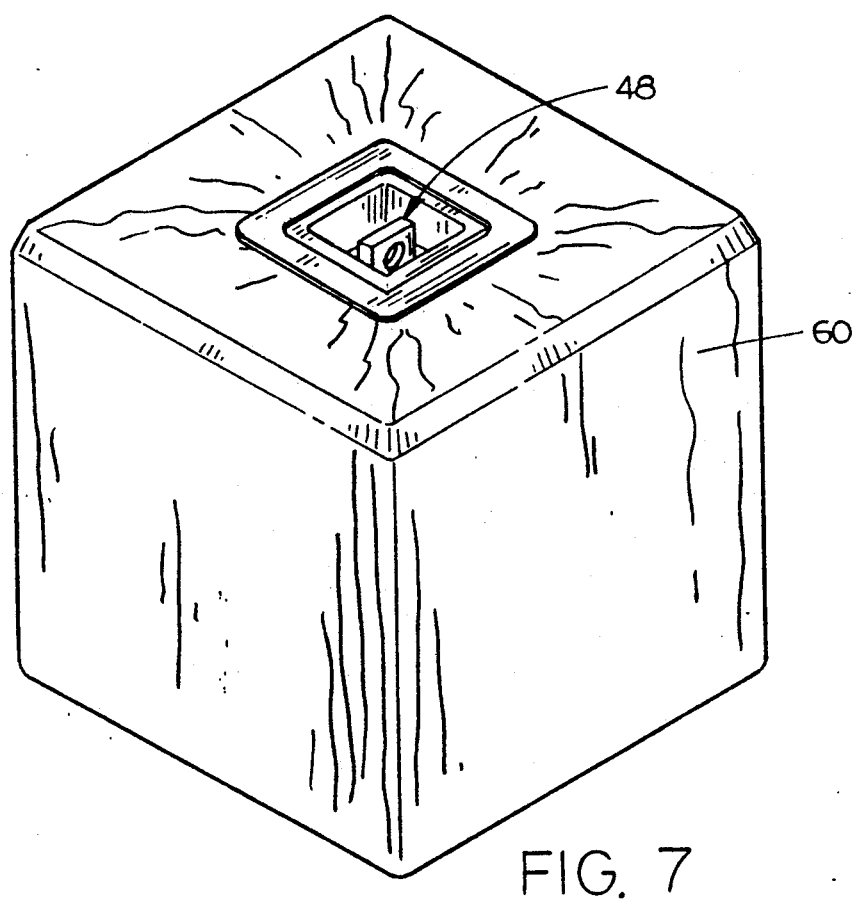
FIG. 7 is a perspective view of the resulting non-friable mass.

The material in the form will normally cure in approximately nine hours after which time the form is stripped from the resultant mass, referred to generally by the reference numeral 60. The plastic bag is folded over the top of the mass 60, as illustrated in FIG. 7, and sealed with tape so that only the upper end of the lifting eye 48 is exposed to permit the subsequent handling of the mass.

A suitable lifting device, such as a crane or the like, may be used to lift the cube onto a truck for subsequent transport and storage. The cubes may be stacked one on top of the other since the upper end of the lifting eye 48 is recessed in the top of the mass. The cubes lend themselves to storage and transfer. The inventor has determined that fewer man-hours are required to dispose of equal volumes of the ACM cubes as opposed to the other methods normally employed in sacking, loading and unloading of plastic bags having ACM material thereon. The cubes or non-friable masses produced by the method of this invention save space at the disposal site and are much safer to handle than plastic bags containing contaminated water and asbestos-containing material therein. The cubes of this invention require a smaller volume than bags required for a given amount of ACM which saves on dumping costs at a disposal site when the dump fee is on a volume basis.

Thus it can be seen that a novel method of casting friable asbestos-containing material into a non-friable mass has been described which achieves all of the stated objectives.

I claim:

1. A method of casting friable asbestos-containing material into a non-friable mass for storage or disposal, comprising the steps of:
   (1) loading portland cement, water and friable asbestos-containing material into a mixer;
   (2) mixing said cement, water and asbestos-containing material to form a mixture;
   (3) providing a form having side walls, a bottom, an open upper end, and a drain opening through one of said side walls;
   (4) lining said form with a plastic bag means having an upper end;
   (5) providing communication between said drain opening, said plastic bag means, and said mixture to be placed in said plastic bag means, to thereby allow for the drainage of fluid from said mixture,
   (6) pouring said mixture into said plastic bag means;
   (7) compressing said poured mixture into said plastic bag means to drain fluid from said mixture;
   (8) placing a cover over said mixture in said form;
   (9) lowering at least a portion of said cover into said mixture to further compress said mixture while allowing said mixture to cure and harden into a hardened non-friable mass;
   (10) capturing said fluid drained from said mixture;
   (11) removing said form from said hardened non-friable mass; and
   (12) closing said upper end of said plastic bag means to enclose said hardened non-friable mass.

2. The method of claim 1 wherein molding plaster is also mixed with said portland cement, water and said friable asbestos-containing material to hasten said curing process.

3. The method of claim 1 wherein a quantity of a plasticizer is added to said mixture for accelerating said curing process.

4. The method of claim 1, further comprising the steps of:
   providing a perforated collection container means; and
   placing said perforated container means in communication with said plastic bag means and said drain opening prior to said step of pouring said mixture into said plastic bag means, to drain excess water from said mixture.

5. The method of claim 1, further comprising the step of adding said fluid drained from said mixture into a subsequent mixture of other asbestos-containing materials.

6. A method of casting friable asbestos-containing material into a non-friable mass for storage or disposal, comprising the steps of:
   (1) loading portland cement, water and friable asbestos-containing material into a mixer;
   (2) mixing said cement, water and asbestos-containing material to form a mixture;
   (3) providing a form having side walls, a bottom, an open upper end, and a drain opening through one of said side walls;
   (4) lining said form with a plastic bag means having an upper end;
   (5) providing communication between said drain opening, said plastic bag means, and said mixture to be placed in said plastic bag means, to thereby allow for the drainage of fluid from said mixture;
   (6) providing a lifting eye means, including a base portion and a vertically extending rod portion with an opening at an upper end of said rod portion, said rod portion having a length less than the height of said form side walls so that said rod portion fits completely within said form;

(7) inserting said lifting eye means within said plastic bag means in said form with said rod portion located generally centrally therein;

(8) pouring said mixture into said plastic bag means, on said lifting eye means base portion, and around said lifting eye means rod portion;

(9) compressing said poured mixture into said plastic bag means to drain fluid from said mixture;

(10) providing a form cover having a lower portion adapted to fit within said side walls of said form, and a recess in said lower portion to receive said upper end of said lifting eye means rod portion to the extent of said opening in said upper end of said rod portion;

(11) placing said cover over said mixture in said form;

(12) lowering said lower portion of said cover into said mixture to further compress said mixture and to divert a portion of said mixture away from said upper end of said lifting eye means rod portions;

(13) waiting a predetermined period of time to allow said compressed mixture to cure and harden into a hardened non-friable mass;

(14) capturing said fluid drained from said mixture;

(15) removing said form from said hardened non-friable mass; and

(16) closing said upper end of said plastic bag means so as to reveal said upper end of said rod portion of said lifting eye means and to encase said hardened non-friable mass.

7. The method of claim 6, further comprising the steps of:

providing a perforated collection container means; and placing said perforated container means in communication with said plastic bag means and said drain opening prior to said step of pouring said mixture into said plastic bag means, to drain excess water from said mixture.

8. The method of claim 6, further comprising the step of adding said fluid drained from said mixture into a subsequent mixture of other asbestos-containing materials.

* * * * *